US010296636B2

(12) United States Patent
Hu et al.

(10) Patent No.: US 10,296,636 B2
(45) Date of Patent: May 21, 2019

(54) EFFICIENT NAVIGATION CATEGORY MANAGEMENT

(71) Applicant: Alibaba Group Holding Limited, George Town, Grand Cayman (KY)

(72) Inventors: Bin Hu, Hangzhou (CN); Xiaoyun Gao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 343 days.

(21) Appl. No.: 15/287,562

(22) Filed: Oct. 6, 2016

(65) Prior Publication Data

US 2017/0103118 A1 Apr. 13, 2017

(30) Foreign Application Priority Data

Oct. 9, 2015 (CN) .......................... 2015 1 0648622

(51) Int. Cl.
*G06F 17/30* (2006.01)

(52) U.S. Cl.
CPC .. *G06F 17/30598* (2013.01); *G06F 17/30876* (2013.01)

(58) Field of Classification Search
CPC ................................................. G06Q 30/0623
See application file for complete search history.

(56) References Cited

U.S. PATENT DOCUMENTS

| 4,281,391 | A | 7/1981 | Huang |
| 6,526,166 | B1 | 2/2003 | Gorman |
| 6,697,947 | B1 | 2/2004 | Matyas, Jr. |
| 6,726,094 | B1 | 4/2004 | Rantze |
| 7,044,741 | B2 * | 5/2006 | Leem ................ G06F 17/30749 434/156 |
| 7,149,720 | B2 | 12/2006 | Shepherd |
| 7,321,874 | B2 | 1/2008 | Dilip |
| 7,734,527 | B2 | 6/2010 | Uzo |
| 7,809,636 | B1 | 10/2010 | Jou |
| 7,809,762 | B1 | 10/2010 | Parker |
| 7,941,760 | B2 | 5/2011 | Kocienda |
| 7,946,474 | B1 | 5/2011 | Agrawal |
| 7,978,900 | B2 | 7/2011 | Nepomniachtchi |
| 8,090,642 | B1 | 1/2012 | Van Doren |
| 8,176,324 | B1 | 5/2012 | Krishnamurthy |
| 8,280,782 | B1 | 10/2012 | Talreja |
| 8,423,392 | B2 | 4/2013 | Moxley |
| 8,423,467 | B1 | 4/2013 | Johansson |
| 8,645,295 | B1 | 2/2014 | Dillard |

(Continued)

FOREIGN PATENT DOCUMENTS

| CN | 201498035 | 6/2010 |
| DE | 102004047258 | 4/2006 |

(Continued)

*Primary Examiner* — William Spieler
(74) *Attorney, Agent, or Firm* — Shun Yao; Park, Vaughan, Fleming & Dowler LLP

(57) ABSTRACT

One embodiment of the present application provides a system for efficiently managing navigation categories in a multi-site web environment. During operation, the system determines whether a category of a product is a synchronized category. A synchronized category is shared by a main site and a local site of the multi-site web environment. If the category is a synchronized category, the system copies the category from the main site to the local site.

20 Claims, 11 Drawing Sheets

(56) References Cited

U.S. PATENT DOCUMENTS

| | | |
|---|---|---|
| 9,111,073 B1 | 8/2015 | Jiang |
| 9,239,722 B1 | 1/2016 | Calahan |
| 9,621,348 B2 | 4/2017 | Bahjat |
| 2002/0046131 A1* | 4/2002 | Boone .................. G06Q 30/06 705/27.1 |
| 2002/0111916 A1 | 8/2002 | Coronna |
| 2002/0161466 A1 | 10/2002 | Heching |
| 2003/0042301 A1 | 3/2003 | Rajasekaran |
| 2003/0046150 A1* | 3/2003 | Ader .................. G06Q 20/123 705/14.67 |
| 2003/0061172 A1 | 3/2003 | Robinson |
| 2003/0200190 A1 | 10/2003 | Adar |
| 2004/0139008 A1 | 7/2004 | Mascavage |
| 2004/0153407 A1 | 8/2004 | Clubb |
| 2005/0038707 A1 | 2/2005 | Roever |
| 2005/0071637 A1 | 3/2005 | Shirakawa |
| 2005/0075954 A1 | 4/2005 | Matsumoto |
| 2005/0113123 A1 | 5/2005 | Torvinen |
| 2005/0144406 A1 | 6/2005 | Chong, Jr. |
| 2005/0170856 A1 | 8/2005 | Keyani |
| 2005/0240935 A1 | 10/2005 | Ramanathan |
| 2006/0010190 A1 | 1/2006 | Shimbo |
| 2006/0056626 A1 | 3/2006 | Keohane |
| 2006/0069635 A1 | 3/2006 | Ram |
| 2006/0089897 A1 | 4/2006 | Maas |
| 2006/0176847 A1 | 8/2006 | Chen |
| 2006/0220842 A1 | 10/2006 | Breed |
| 2006/0271783 A1 | 11/2006 | Wong |
| 2007/0035617 A1 | 2/2007 | Ko |
| 2007/0043651 A1 | 2/2007 | Xiao |
| 2007/0276730 A1 | 11/2007 | Lee |
| 2008/0004981 A1 | 1/2008 | Gopalpur |
| 2008/0077542 A1 | 3/2008 | McElhiney |
| 2008/0097805 A1 | 4/2008 | Wells |
| 2008/0119160 A1 | 5/2008 | Andriantsiferana |
| 2008/0120160 A1 | 5/2008 | Woo |
| 2008/0182586 A1 | 7/2008 | Aaron |
| 2008/0228595 A1 | 9/2008 | Hill |
| 2008/0306839 A1 | 12/2008 | Starrs |
| 2009/0076926 A1 | 3/2009 | Zinberg |
| 2009/0090772 A1 | 4/2009 | Lee |
| 2009/0106825 A1 | 4/2009 | Cerruti |
| 2009/0144451 A1 | 6/2009 | Cabezas |
| 2009/0157522 A1 | 6/2009 | Srinivasan |
| 2009/0195506 A1 | 8/2009 | Geidl |
| 2010/0060585 A1 | 3/2010 | Chiu |
| 2010/0073302 A1 | 3/2010 | Ritzau |
| 2010/0088026 A1 | 4/2010 | Manolescu |
| 2010/0162036 A1 | 6/2010 | Linden |
| 2010/0191648 A1 | 7/2010 | Smith |
| 2010/0210240 A1 | 8/2010 | Mahaffey |
| 2010/0223543 A1 | 9/2010 | Marston |
| 2010/0235283 A1 | 9/2010 | Gerson |
| 2010/0241575 A1 | 9/2010 | Cotton |
| 2010/0250436 A1 | 9/2010 | Loevenguth |
| 2011/0016520 A1 | 1/2011 | Cohen |
| 2011/0093493 A1 | 4/2011 | Nair |
| 2011/0125616 A1 | 5/2011 | Ni |
| 2011/0184840 A1 | 7/2011 | Godard |
| 2011/0231465 A1 | 9/2011 | Phatak |
| 2011/0258027 A1 | 10/2011 | Lee |
| 2011/0264598 A1 | 10/2011 | Fuxman |
| 2012/0016799 A1 | 1/2012 | Killian |
| 2012/0076283 A1 | 3/2012 | Ajmera |
| 2012/0101942 A1 | 4/2012 | Park |
| 2012/0117271 A1 | 5/2012 | Kennedy |
| 2012/0143924 A1 | 6/2012 | Sethi |
| 2012/0158467 A1 | 6/2012 | Hammad |
| 2012/0204256 A1 | 8/2012 | Craine |
| 2012/0259774 A1 | 10/2012 | Marti |
| 2012/0259783 A1 | 10/2012 | Kemper |
| 2012/0299831 A1 | 11/2012 | Lioy |
| 2012/0323846 A1 | 12/2012 | Bai |
| 2013/0066889 A1 | 3/2013 | Rodriguez |
| 2013/0094751 A1 | 4/2013 | Nepomniachtchi |
| 2013/0110670 A1 | 5/2013 | Webber |
| 2013/0232071 A1 | 9/2013 | Dilip |
| 2013/0246172 A1 | 9/2013 | Moissinac |
| 2013/0311532 A1 | 11/2013 | Olsen |
| 2013/0317895 A1 | 11/2013 | Turner |
| 2013/0331130 A1 | 12/2013 | Lee |
| 2014/0037184 A1 | 2/2014 | Gorski |
| 2014/0052636 A1 | 2/2014 | Mattes |
| 2014/0156512 A1 | 6/2014 | Rahman |
| 2014/0162698 A1 | 6/2014 | Han |
| 2014/0164109 A1 | 6/2014 | Chow |
| 2014/0236801 A1 | 8/2014 | Hansen |
| 2014/0279525 A1 | 9/2014 | Mohsenzadeh |
| 2014/0280910 A1 | 9/2014 | Swig |
| 2014/0306896 A1 | 10/2014 | Sosby |
| 2014/0310171 A1 | 10/2014 | Grossman |
| 2015/0066679 A1 | 3/2015 | Mack |
| 2015/0186989 A1 | 7/2015 | Kneen |
| 2015/0220876 A1 | 8/2015 | Sethi |
| 2015/0235477 A1 | 8/2015 | Simkin |
| 2015/0356288 A1 | 12/2015 | Guo |
| 2015/0379460 A1 | 12/2015 | Zamer |
| 2016/0012503 A1 | 1/2016 | Fu |
| 2016/0055490 A1* | 2/2016 | Keren .................. G06Q 30/00 705/14.47 |
| 2016/0077734 A1 | 3/2016 | Buxton |
| 2017/0270598 A1 | 9/2017 | Ram |

FOREIGN PATENT DOCUMENTS

| | | |
|---|---|---|
| EP | 0992949 | 4/2000 |
| EP | 1067471 | 1/2001 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2008532112 | 8/2008 |
| JP | 2009020676 | 1/2009 |
| JP | 2014515149 | 6/2014 |
| KR | 1020020057906 | 7/2002 |
| WO | 2012045128 | 4/2012 |
| WO | 2013003372 | 1/2013 |
| WO | 2013149883 | 10/2013 |
| WO | 2017080768 | 5/2017 |

* cited by examiner

IDENTIFIER MAPPING TABLE 242

| SITE | IDENTIFIER RANGE |
|---|---|
| MAIN SITE 160 | ID RANGE 250 (1~201000000) |
| LOCAL SITE 162 | ID RANGE 252 (201000001~202000000) |
| LOCAL SITE 164 | ID RANGE 254 (202000001~203000000) |

FIG. 2B

CATEGORY MAPPING TABLE 244

| CATEGORY | MAIN SITE CATEGORY IDENTIFIER | LOCAL SITE CATEGORY IDENTIFIER |
|---|---|---|
| CATEGORY 180 | IDENTIFIER 260 (1000) | IDENTIFIER 270 (201001000) |
| CATEGORY 182 | IDENTIFIER 262 (1001) | IDENTIFIER 272 (201001001) |
| CATEGORY 184 | IDENTIFIER 264 (1002) | IDENTIFIER 274 (201001002) |

FIG. 2C

EFFICIENT NAVIGATION CATEGORY MANAGEMENT

RELATED APPLICATION

Under 35 U.S.C. § 119, this application claims the benefit and right of priority of Chinese Patent Application No. 201510648622.X, filed 9 Oct. 2015.

BACKGROUND

Field

The present invention relates to the technical field of web interface management and, in particular, relates to a method and system for efficiently managing navigation categories in a distributed web environment.

Related Art

With the rapid development of the Internet, contents of a web environment, such as an e-commerce website, are becoming richer. To facilitate quick access to the contents the users are interested in, such websites can provide a hierarchical category navigation system. Based on this system, users can quickly find the contents that they are interested in. However, the category navigation system needs to be maintained and managed. Typically, in response to the change of requirements, the navigation categories in the system are adaptively updated. For example, in an e-commerce website, the search requirements of users may change due to the change of seasons and holidays. As a result, the navigation categories are updated adaptively to match the buyer's search requirements for commodities.

With the increase of network traffic, increasing numbers of web environments are establishing local sites for load distribution. In a multi-site web environment, the users of different sites typically vary. To meet the search requirements of different users of different sites, each site maintains and employs its own set of category navigation system. When a navigation category needs to be updated, the category maintenance personnel of each site manually update their navigation category. Such manual updates can be tedious, time consuming, and error-prone. Hence, the efficiency of this approach is relatively low.

While a category navigation system brings many desirable features to a web environment, some issues remain unsolved in the management of navigation categories in a multi-site web environment.

SUMMARY

One embodiment of the present application provides a system for efficiently managing navigation categories in a multi-site web environment. During operation, the system determines whether a category of a product is a synchronized category. A synchronized category is shared by a main site and a local site of the multi-site web environment. If the category is a synchronized category, the system copies the category from the main site to the local site.

In a variation of this embodiment, the system establishes a mapping between the category at the main site and the category at the local site, and assigns a category identifier to a respective category. The mapping is based on a first category identifier of the category at the main site and a second category identifier of the category at the local site.

In a further variation, the first category identifier is in a range of identifiers allocated for the main site, and the second category identifier is in a range of identifiers allocated for the local site.

In a variation of this embodiment, the system identifies an operation on the category at the main site. If the category is a synchronized category, the system applies the operation to the category at the local site.

In a further variation, the operation includes one of: addition, deletion, and update.

In a variation of this embodiment, if the category is a synchronized category, the system converts the category at the local site to a differentiated category by terminating a mapping between the category at the main site and the category at the local site, and setting the category to be a differentiated category.

In a variation of this embodiment, if the category is a differentiated category, the system converts the category at the local site to a synchronized category by deleting the category at the local site, copying the category from the main site to the local site, and establishing a mapping between the category at the main site and the copied category at the local site.

In a variation of this embodiment, the main site and the local site are distributed in different geographic areas.

BRIEF DESCRIPTION OF THE DRAWINGS

The accompanying drawings herein, which are incorporated herein and constitute a part of the specification, illustrate several exemplary embodiments of the present application and, together with the description, serve to illustrate the present application, construing no limitation thereto. In the drawings:

FIG. 2B illustrates an exemplary identifier mapping table, in accordance with an embodiment of the present application.

FIG. 2C illustrates an exemplary category mapping table, in accordance with an embodiment of the present application.

In the figures, like reference numerals refer to the same figure elements.

DETAILED DESCRIPTION OF EMBODIMENTS

Embodiments of the present invention solve the problem of facilitating efficient category management in a multi-site web environment by (i) identifying the categories that remain same in a respective site; and (ii) automatically synchronizing these categories across a respective site. With existing technologies, even when a category is the same in each site, the administrator of each site manually manages (e.g., adds, deletes, or updates) that category. As a result, even when a category that can be managed without differentiation across the sites, the same operations are repeated for that category at all sites, which leads to significant resource usage. For example, when a new cell phone model comes to the market, the cell phone model should be added to the cell phone category. With existing technologies, the same operation needs to be repeated at each site. If the category structures of the sites are different, this operation can become tedious and error-prone.

To solve these problems, embodiments of the present invention allow a category navigation system to determine whether a category at a site is a differentiated category. If a category is presented differently at two different sites (e.g., has different sub-categories or has a different name), that category can be referred to as a differentiated category. If a category is not a differentiated category, the category is the same in each site. If the category is modified at a site, the system automatically synchronizes that category with a respective site. This category can be referred to as a synchronized category. Since operations on a synchronized category can be managed at a single location, the automatic synchronization avoids the issues incurred by the repeated operations for the category at each site.

Figure 1A:
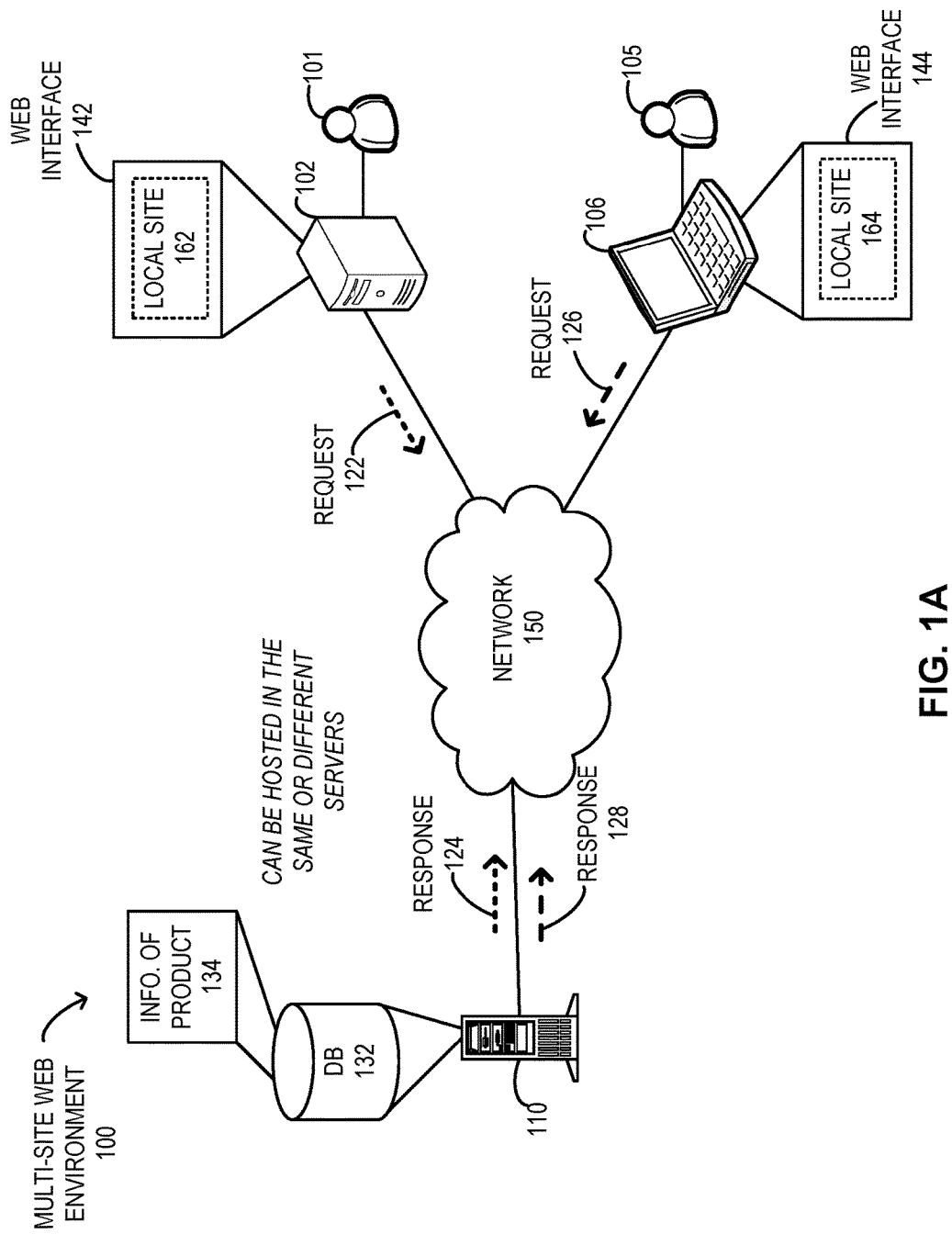
FIG. 1A illustrates an exemplary web environment facilitating an efficient category navigation system, in accordance with an embodiment of the present application.

FIG. 1A illustrates an exemplary web environment facilitating an efficient category navigation system, in accordance with an embodiment of the present application. In this example, a server 110 facilitates a multi-site web environment 100 for e-commerce services. Server 110 is coupled to and accessible via a network 150, which can be a local or wide area network (e.g., the Internet). Users 101 and 105 of web environment 100 can be located at different locations (e.g., different countries or continents). As a result, for the same e-commerce service, users 101 and 105 can see two different websites. Each of such websites can be referred to as a local site. One of the local sites of web environment 100 can be a main site, which can be the representative site for the e-commerce services and is provided to the users without a corresponding local site. In some embodiments, the main site and the local site are distributed in different geographic areas. For example, the main site can operate in North America and a local site can operate in Asia.

To facilitate the navigation categories to users 101 and 105, a category operation administrator can modify navigation category data, which can be stored in a database 132 in server 110. In some embodiments, the category navigation system of web environment 100 identifies the products associated with a category and establishes a relationship (e.g., a relationship in a relational database) between the category and the identified products. The search service of web environment 100 can use this relationship information to create an index for the product. This index can be an identifier of a category to which the product belongs. When user 101 or 105 searches for a keyword, the category navigation system returns the navigation categories associated with the matched products for the user to choose from.

During operation, if a user 101 wishes to purchase a product 134 from the corresponding local site 162, a client device 102 of user 101 can access local site 162 using a web interface 142 (e.g., a browser) and searches for product 134. Web interface 142 issues a request 122 (e.g., an HTTP request) to server 110, which stores the information associated with product 134 in database 132. Upon receiving request 122, server 110 obtains the information associated with product 134 (e.g., a navigation category) and sends a response 124 comprising the information back to web interface 142. Based on one or more such requests and responses, web interface 142 displays a web page corresponding to local site 162 to user 101. Based on the navigation categories of local site 162, server 110 presents a category of product 134 to user 101.

On the other hand, if user 105 searches for the same product 134, server 110 can present a different local site 164 with a different outline to user 105. For example, a client device 106 of user 105 can access local site 164 using a web interface 144. Web interface 144 issues a request 126 to server 110, which sends a response 128 back to web interface 144. Based on one or more such requests and responses, web interface 144 displays a web page corresponding to local site 164 to user 105. Since user 105 is at a different location, server 110 may present a different category for product 134 at local site 164. It should be noted that the web services associated with different sites of the e-commerce services can be hosted at the same server or at different locations. As a result, requests 122 and 126 can be served from the same server or from different servers at different locations.

With existing technologies, even when the category of product 134 is the same at sites 162 and 164, the category is manually established for each site. As a result, the same operations are repeated for that category at server 110 (or any other server that may host a local site) for each site. This can lead to significant resource usage. In particular, if the category structures of sites 162 and 164 are different, this operation can become tedious and error-prone. Embodiments of the present invention solve this problem by determining whether the category of product 134 is the same at both sites 162 and 164, and automatically synchronizing the category across sites 162 and 164 (e.g., with the main site).

Requests 122 and 126, and responses 124 and 128 can be data frames. In this disclosure, the term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," "message," or "datagram."

Figure 1B:
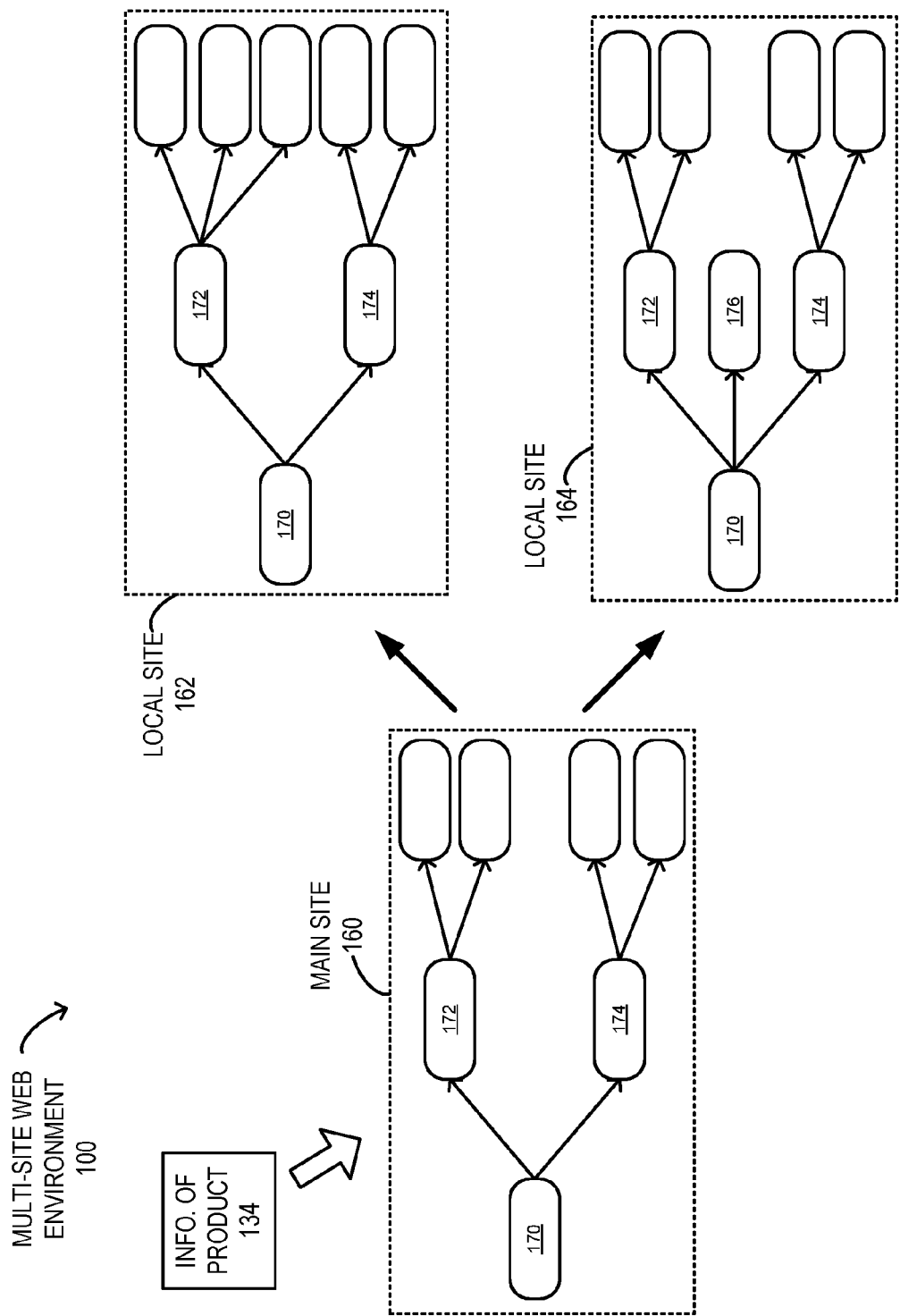
FIG. 1B illustrates an exemplary differentiated category tree in a distributed web environment, in accordance with an embodiment of the present application.

FIG. 1B illustrates an exemplary differentiated category tree in a distributed web environment, in accordance with an embodiment of the present application. In this example, web environment 100 includes a main site 160 in which product 134 is categorized under navigation category 170. In some embodiments, main site 160, and local sites 162 and 164 are distributed in different geographic areas. For example, main site 160 can operate in North America, and local sites 162 and 164 can operate in Europe and Asia, respectively. Navigation category 170 can include sub-categories 172 and 174. Category 170 can be referred to as the parent category of sub-categories 172 and 174. Here, category 170, sub-categories 172 and 174, and any further sub-categories thereof forms a category tree for category 170. Category 170 can be referred to as the root category of the category tree. The category navigation system of web environment 100 determines whether category 170 is a differentiated category. For example, if category 170 is presented differently at sites 162 and 164, category 170 can be referred to as a differentiated category.

If category 170 is a differentiated category, the category navigation system copies the category tree of category 170 to local sites 162 and 164. Each of the local sites is then updated based on the categorization criteria of the local site. For example, at local site 162, sub-category 172 can have more sub-categories than main site 160; and at local site 164, category 170 can have an additional sub-category 176, which may not be present in sites 160 and 162. In this way, a category tree of the main site can be used to generate the initial category tree at a local site. Then the copy the category tree of the main site is further updated for the local site to represent the categorization of that local site to provide the differentiation.

Figure 1C:
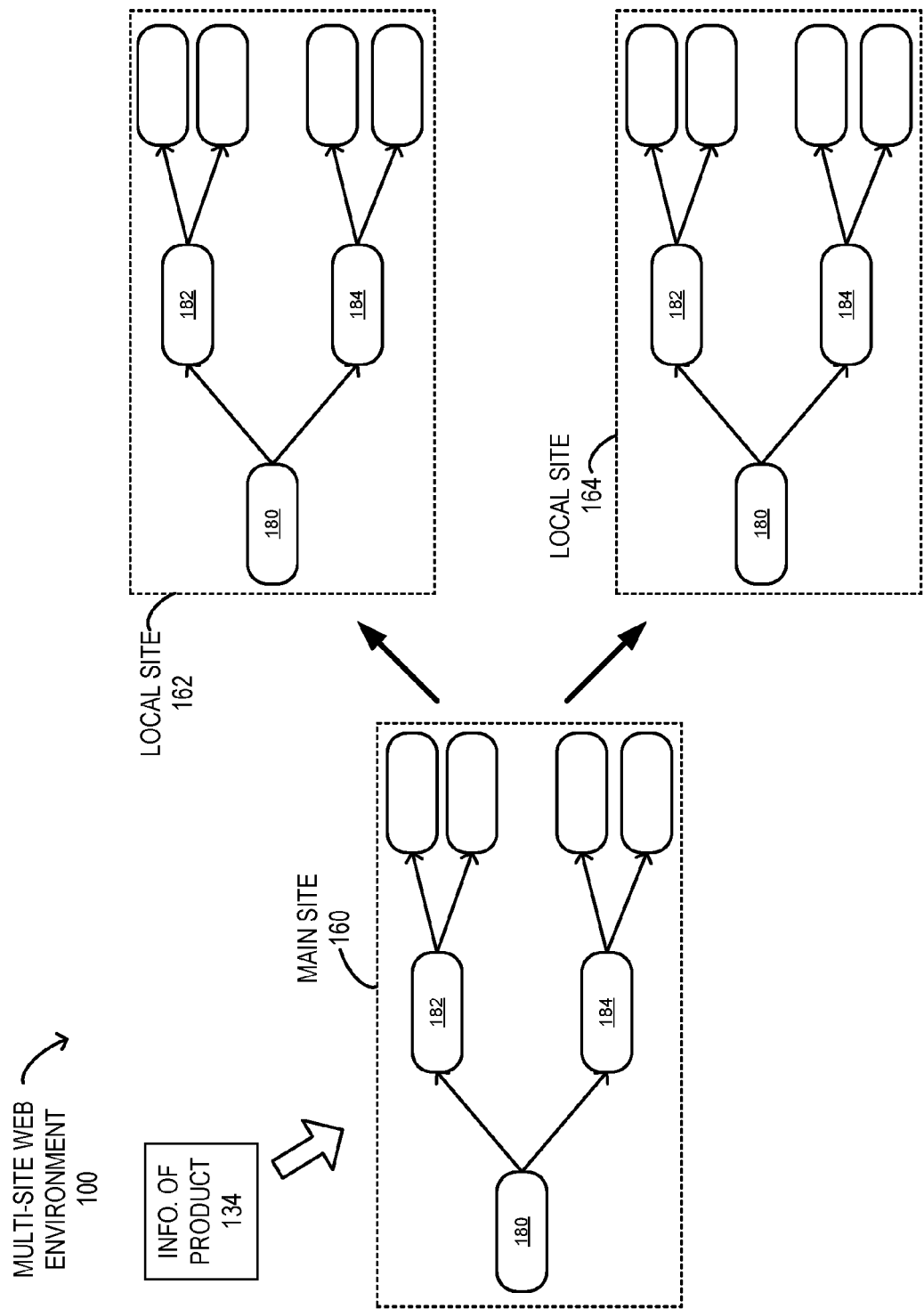
FIG. 1C illustrates an exemplary synchronized category tree in a distributed web environment, in accordance with an embodiment of the present application.

FIG. 1C illustrates an exemplary synchronized category tree in a distributed web environment, in accordance with an embodiment of the present application. In this example, main site 160 includes product 134 under navigation category 180. Navigation category 180 can include sub-categories 182 and 184. The category navigation system of web environment 100 determines whether category 180 is a differentiated category. For example, if category 180 is the same at sites 162 and 164, category 180 is not a differentiated category and can be referred to as a synchronized category.

If category 180 is a synchronized category, the category navigation system copies the category tree of category 180 to local sites 162 and 164. Furthermore, the category navigation system establishes a mapping relationship between category 180 at main site 160 and category 180 at respective local sites 162 and 164. Based on the mapping, any modification to the category tree of category 180 at main site 160 is automatically synchronized with the category tree of category 180 at respective local sites 162 and 164. For example, if sub-category 182 is updated at main site 160, that update is automatically synchronized with sub-category 182 at local sites 162 and 164. In this way, category 180 is shared among main site 160, and local sites 162 and 164. This allows operations on synchronized category 180 to be managed at main site 160, thereby avoiding the repeated operations for category 180 at local sites 162 and 164.

Figure 2A:
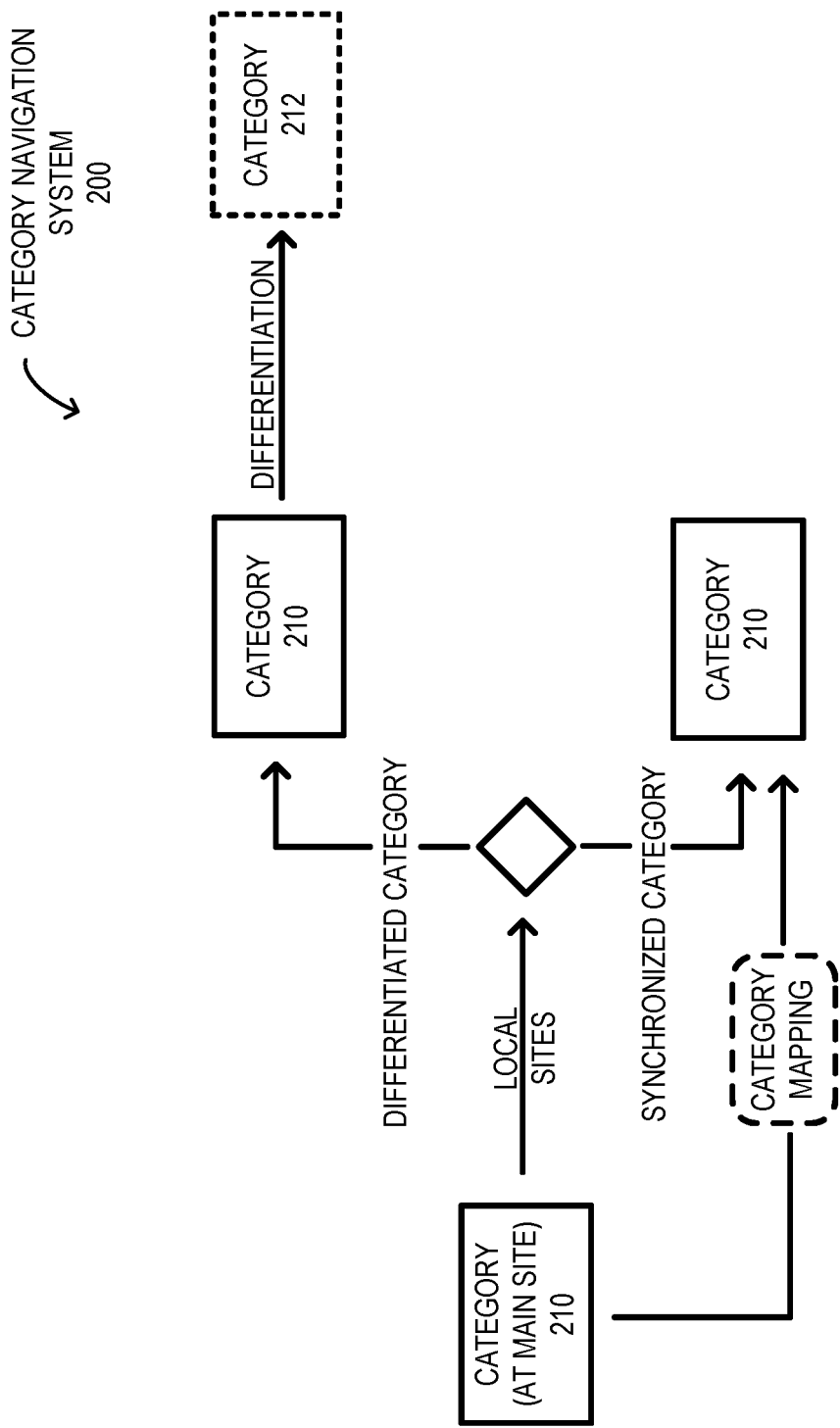
FIG. 2A illustrates an exemplary schematic of a category navigation system classifying differentiated and synchronized categories, in accordance with an embodiment of the present application.

FIG. 2A illustrates an exemplary schematic of a category navigation system classifying differentiated and synchronized categories, in accordance with an embodiment of the present application. Upon establishing a new category 210 at a main site, a category navigation system 200 determines the type of category for category 210. This determination can be performed at the main site or a local site. If category 210 is a differentiated category at a local site, category navigation system 200 first copies category 210 to the local site as category 210. To facilitate differentiation in category, category 210 is then updated at the local site to generate a differentiated category 212.

On the other hand, if category 210 is a synchronized category for a local site, category navigation system 200 copies category 210 to the local site and establishes a mapping relationship between category 210 at the main site and at the local site. This mapping relationship can be referred to as a category mapping. This category mapping allows synchronous updates to the local sites. For example, if category 210 is updated at the main site, category navigation system 200 identifies the categories mapped to category 210 in a respective local site and automatically synchronizes the update (i.e., performs the same update) with that category 210 at a respective local site.

To uniquely identify a category (or any sub-category in a category tree), a category navigation system allocates a category identifier to that category. In some embodiments, a category tree (i.e., a category and any sub-category thereof) can be identified by the category identifier of the root category of the category tree. To make sure that the same category at different sites is disguisable from each other, the category navigation system allocates different ranges of identifiers to each site. FIG. 2B illustrates an exemplary identifier mapping table, in accordance with an embodiment of the present application. In this example, the category navigation system maintains an identifier mapping table 242 that maps a range of identifiers to a corresponding site.

Here, the category navigation system allocates non-overlapping ranges of identifiers (or identifier ranges) 250, 252, and 254 to sites 160, 162, and 164, respectively. Such an identifier can be referred to as a category identifier. When a particular category is assigned an identifier, the system can determine the site based on the identifier. Suppose that ranges of identifiers 250, 252, and 254 are (1~201000000), (201000001~202000000), and (202000001~203000000), respectively. In the example in FIG. 1C, the system assigns an identifier in range 250 to category 180 at main site 160, in range 252 at local site 162, and in range 254 at local site 164. As a result, when the system obtains a category identifier for a particular product, the system can determine the site of category 180, which is the same at each site, based on the assigned identifier.

Furthermore, at each site, the system maintains a mapping between a product and one or more categories associated with the product based on the identifiers. In the example in FIG. 1C, product 134 is in category 180. Hence, the system maps product 134 to the identifier of category 180 at each site. For example, product 134 is mapped to an identifier in range 254 at site 164. When a user searches for product 134 at site 164, the system obtains the identifier (or identifiers) mapped to product 134 and presents the corresponding category (or categories).

The category navigation system further maintains a category mapping table for synchronized categories. This table maps a category at a main site to the same category at a respective local site. FIG. 2C illustrates an exemplary category mapping table, in accordance with an embodiment of the present application. During operation, the system assigns identifiers 270, 272, and 274 to categories 180, 182, and 184, respectively, at local site 162. Similarly, the system assigns identifiers 260, 262, and 264 to categories 180, 182, and 184, respectively, at main site 160.

Suppose that, identifiers 260, 262, and 264 have values 1000, 1001, and 1002 in range 250. Identifiers 270, 272, and 274 have values 201001000, 201001001, and 201001002 in range 252. Since category 180 is a synchronized category, the system maps identifier 260 to identifier 270 for category 180 in category mapping table 244. In the same way, the system maps identifier 262 to identifier 272 for category 182 and identifier 264 to identifier 274 for category 184 in category mapping table 244. As a result, if category 180 is updated at main site 160, the system determines that identifier 260 is mapped to identifier 270. The system determines that identifier 270 is in range 252 and therefore, is associated with local site 162. The system then identifies and synchronizes the updates with (i.e., applies the same updates to) category 180 at local site 162.

Figure 3A:
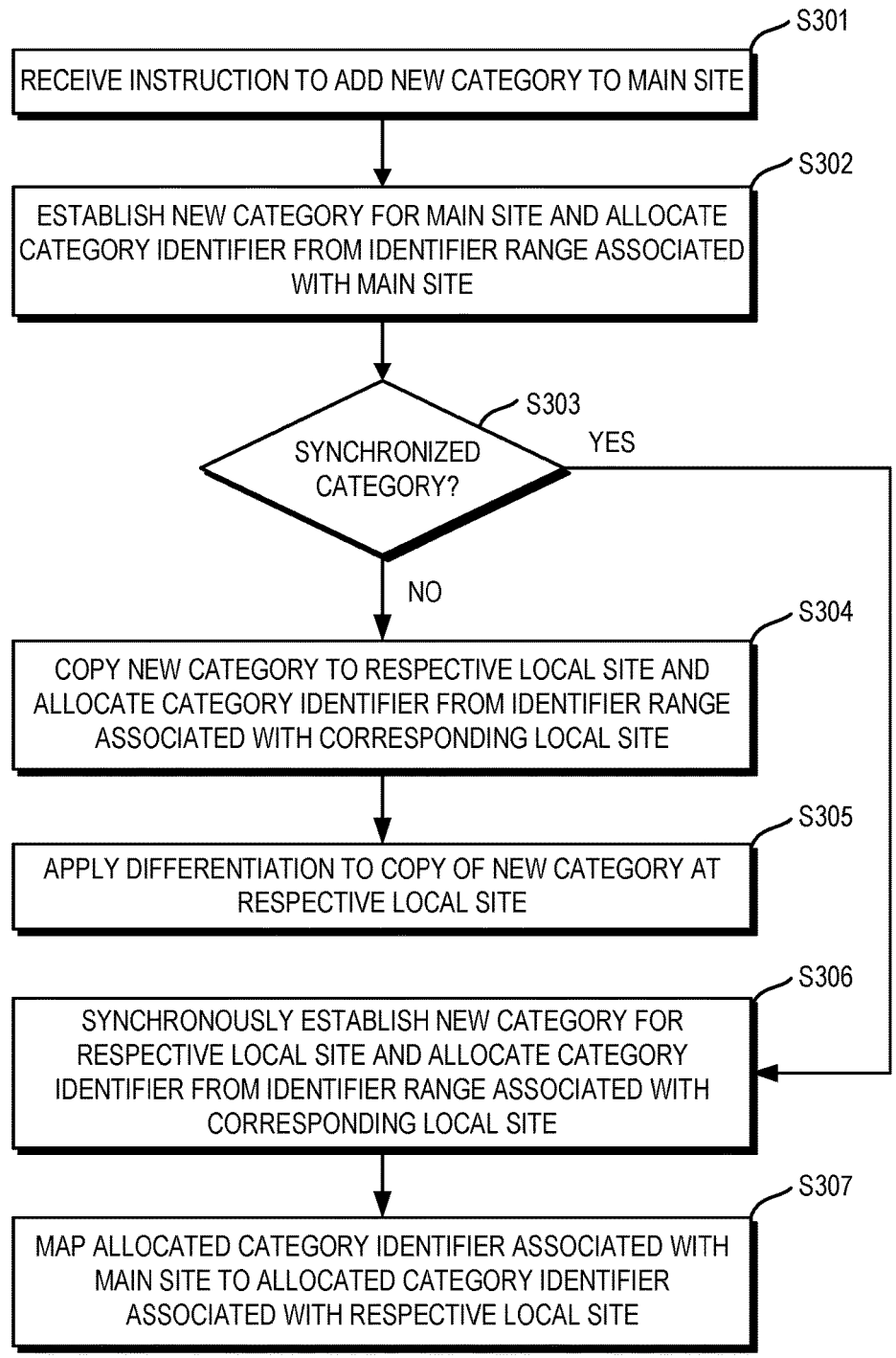
FIG. 3A presents a flowchart illustrating the process of a category navigation system adding a new category, in accordance with an embodiment of the present application.

When a new synchronized category is added, or an existing synchronized category is deleted or updated, the category navigation system synchronously updates the category at a respective site. FIG. 3A presents a flowchart illustrating the process of a category navigation system adding a new category, in accordance with an embodiment of the present application. During operation, the system receives an instruction to add a new category to the main site (operation S301). In some embodiments, the instruction is received from an administrator. The system establishes the new category for the main site and allocates a category identifier from the range of identifiers (i.e., identifier range) associated with the main site (operation S302).

The system then checks whether the new category is a synchronized category (operation S303). The instruction can specify whether the category is a synchronized category. The system can also maintain a set of generic product classes and if the category is associated with one or more of the product classes, the system determines that the new category is a synchronized category. If the new category is not a synchronized category, the system copies the new category to a respective local site and allocates a category identifier from the identifier range associated with the corresponding local site (operation S304). The system then applies a differentiation to the copy of the new category at a respective local site (operation S305). In some embodiments, an administrator provides the differentiation to the system.

If the new category is a synchronized category, the system synchronously establishes the new category for a respective local site and allocates a category identifier from the identifier range associated with the corresponding local site (operation S306). The system then maps the allocated category identifier associated with the main site to the allocated category identifier associated with a respective local site (operation S307), as described in conjunction with FIG. 2C. As a result, if the new category is deleted or updated at the main site, the system can identify and update the new category at a respective local site.

Figure 3B:
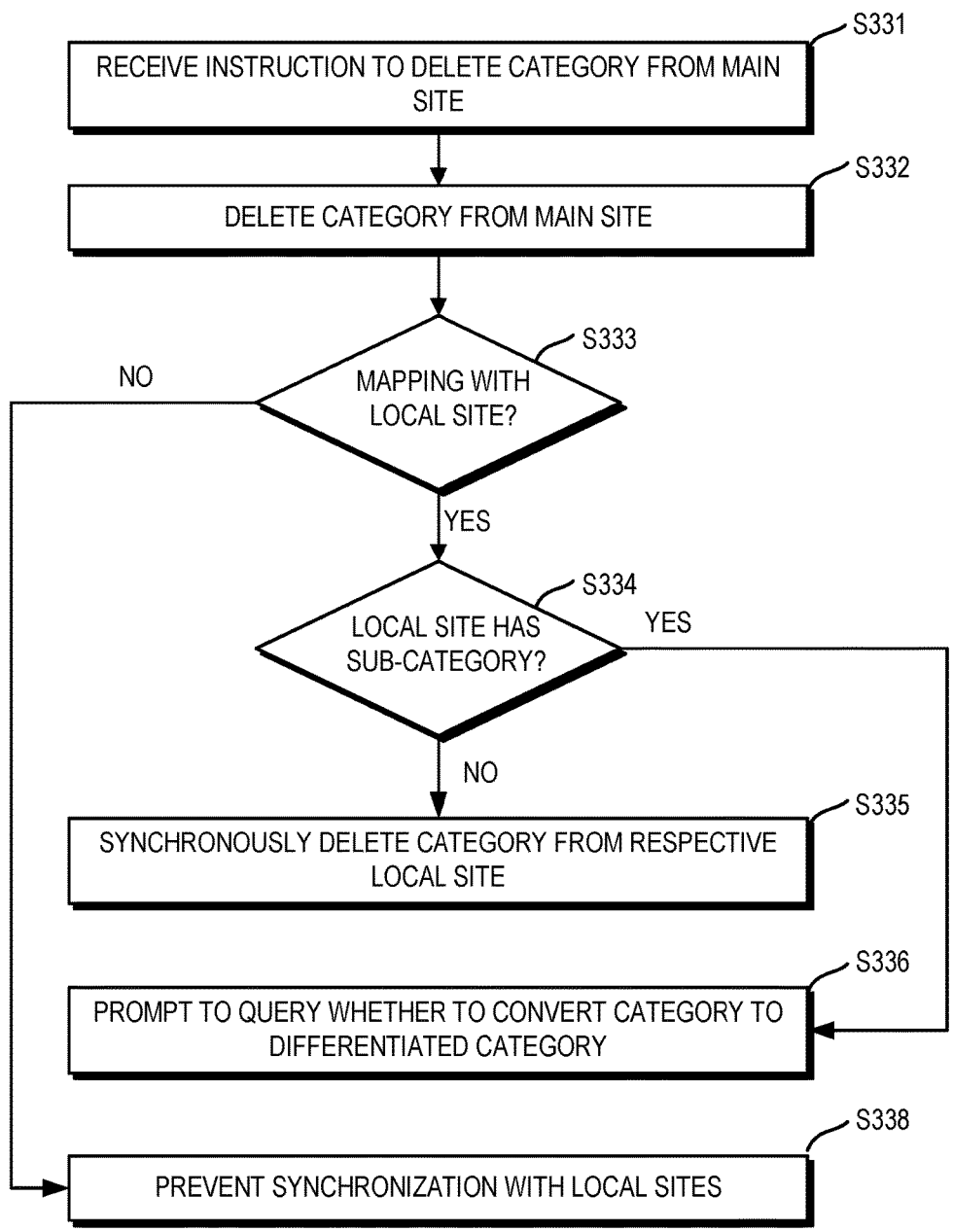
FIG. 3B presents a flowchart illustrating the process of a category navigation system deleting a category, in accordance with an embodiment of the present application.

FIG. 3B presents a flowchart illustrating the process of a category navigation system deleting a category, in accordance with an embodiment of the present application. During operation, the system receives an instruction to delete a category from the main site (operation S331). In some embodiments, the instruction is received from an administrator. The system deletes the category from the main site (operation S332). Deleting a category can include deleting the sub-categories of the category as well. The system then checks whether the category has a mapping with a local site (operation S333). In some embodiments, the mapping is based on category identifiers assigned to the category at a respective site.

If the category does not have a mapping with a local site, the category is a differentiated category. The system then prevents synchronization with the local sites (i.e., does not propagate the delete operation to the local sites) (operation S338). On the other hand, if the category has a mapping with a local site, the category is a synchronous category. The system then checks whether the local site has a sub-category (operation S334). If the local site has a sub-category, the system prompts to query whether to convert a category to a differentiated category (operation S336). Otherwise, the system synchronously deletes the category from a respective local site (operation S335).

Figure 3C:
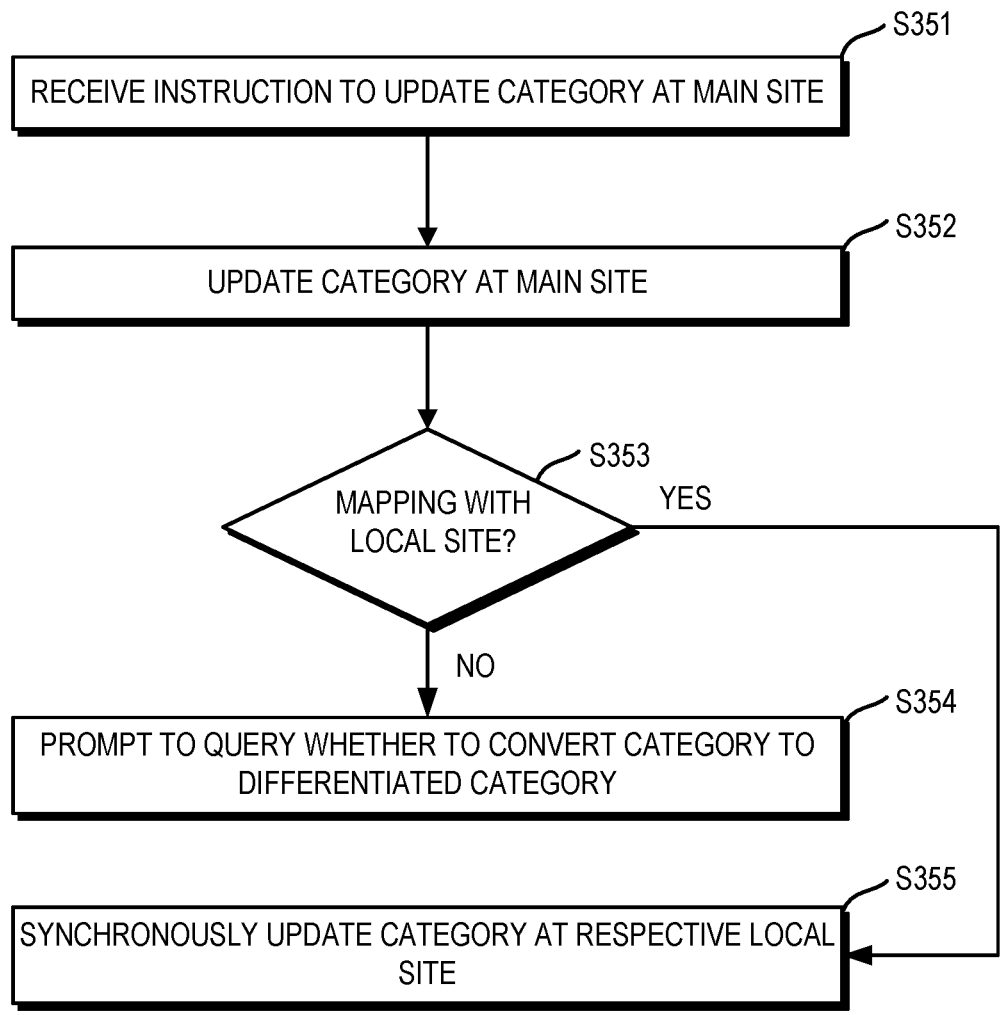
FIG. 3C presents a flowchart illustrating the process of a category navigation system updating a category, in accordance with an embodiment of the present application.

FIG. 3C presents a flowchart illustrating the process of a category navigation system updating a category, in accordance with an embodiment of the present application. During operation, the system receives an instruction to update a category at the main site (operation S351). In some embodiments, the instruction is received from an administrator. The system updates the category at the main site (operation S352). Deleting a category can include updating the sub-categories of the category as well. The system then checks whether the category has a mapping with a local site (operation S353). If the category has a mapping with a local site, the system synchronously updates the category at a respective local site (operation S355). Otherwise, the system prompts to query whether to convert a category to a differentiated category (operation S354).

Figure 4A:
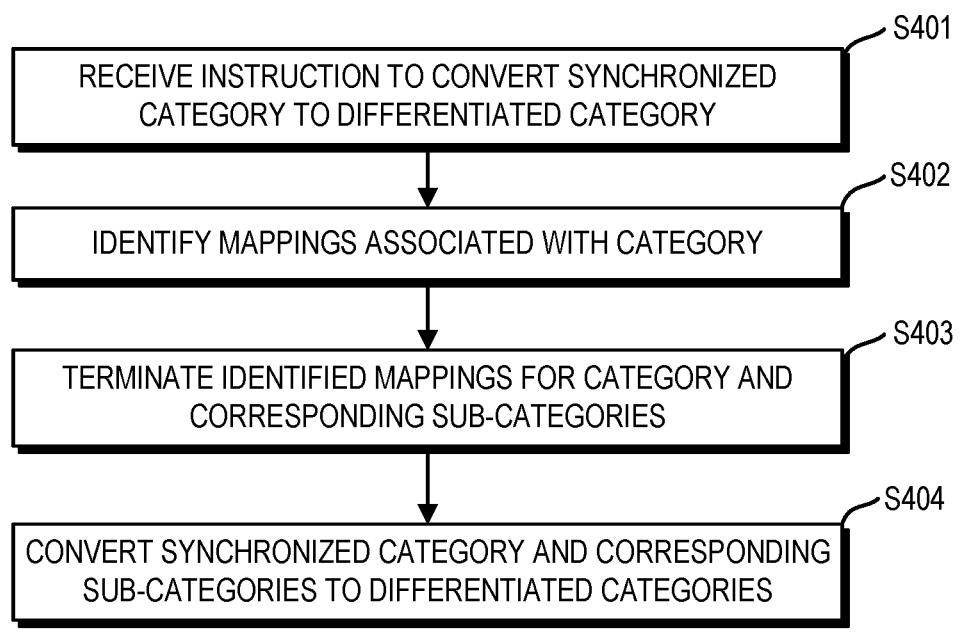
FIG. 4A presents a flowchart illustrating the process of a category navigation system converting a synchronized category to a differentiated category, in accordance with an embodiment of the present application.

FIG. 4A presents a flowchart illustrating the process of a category navigation system converting a synchronized category to a differentiated category, in accordance with an embodiment of the present application. During operation, the system receives an instruction to convert a synchronized category to a differentiated category (operation S401). In some embodiments, the instruction is received from an administrator. The system identifies the mappings (e.g., category mappings) associated with the category (operation S402) and terminates the identified mappings for the category and the corresponding sub-categories (if any) (operation S403). In some embodiments, the termination includes deleting the entries associated with the category identifier of the category from the category mapping table. The system then converts the synchronized category and corresponding sub-categories to differentiated categories (operation S404).

Figure 4B:
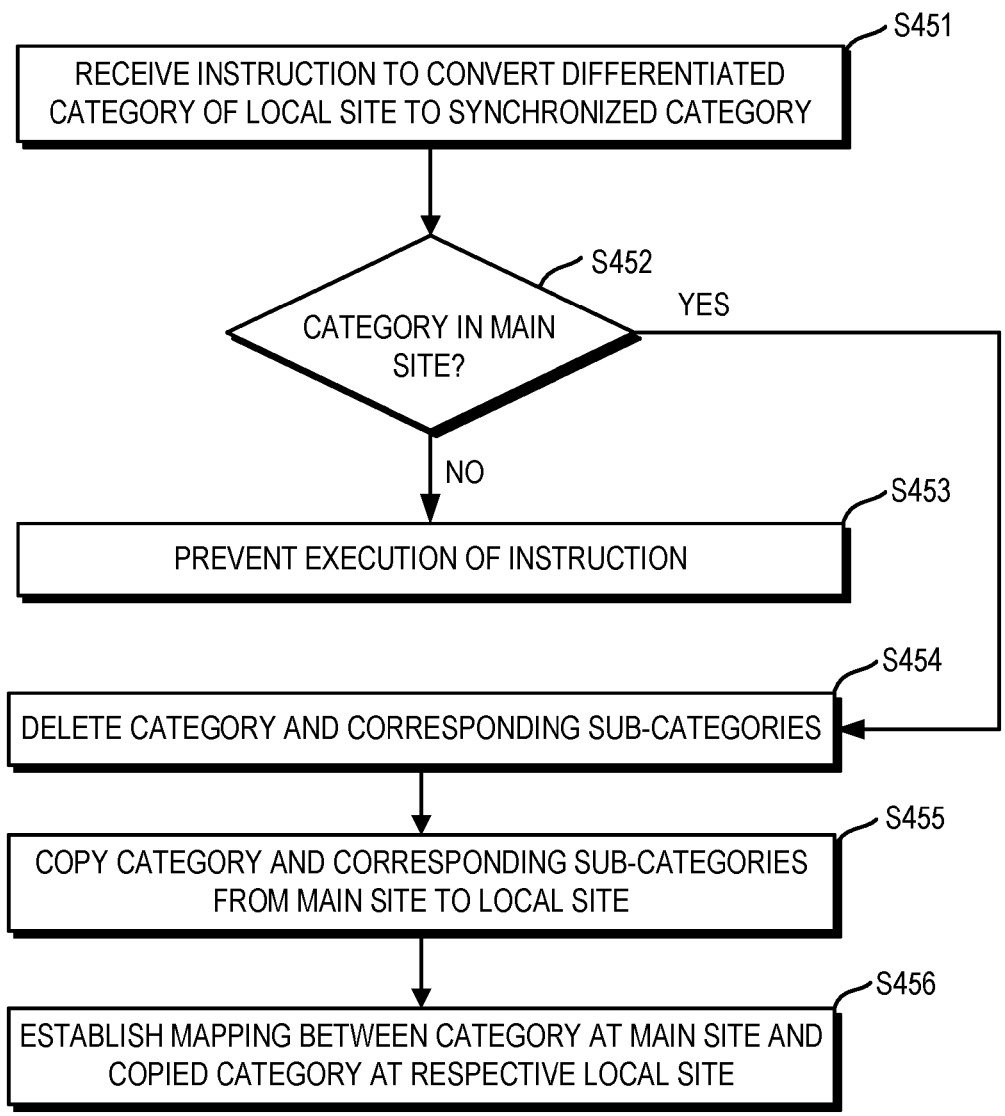
FIG. 4B presents a flowchart illustrating the process of a category navigation system converting a differentiated category to a synchronized category, in accordance with an embodiment of the present application.

FIG. 4B presents a flowchart illustrating the process of a category navigation system converting a differentiated category to a synchronized category, in accordance with an embodiment of the present application. During operation, the system receives an instruction to convert a differentiated category of a local site to a synchronized category (operation S451). In some embodiments, the instruction is received from an administrator. The system then checks whether the category is in the main site (operation S452). If the category is not in the main site, the system cannot establish a synchronized category since the synchronized categories are synchronized with the main site. The system then prevents the execution of the instruction (operation S453).

If the category is in the main site, the system deletes the category and the corresponding sub-categories (operation S454) and copies the category and the corresponding sub-categories from the main site to a respective local site (operation S455). The system then establishes a mapping between the category (and its respective sub-categories) at the main site and the copied category (and its respective copied sub-categories) at a respective local site (operation S456). In some embodiments, the system allocates category identifiers to the copied category and its sub-categories. The system maps the category identifier of the category at the main site to the category identifier of the category at a respective local site, as described in conjunction with FIG. 2C.

Exemplary Apparatus

Figure 5:
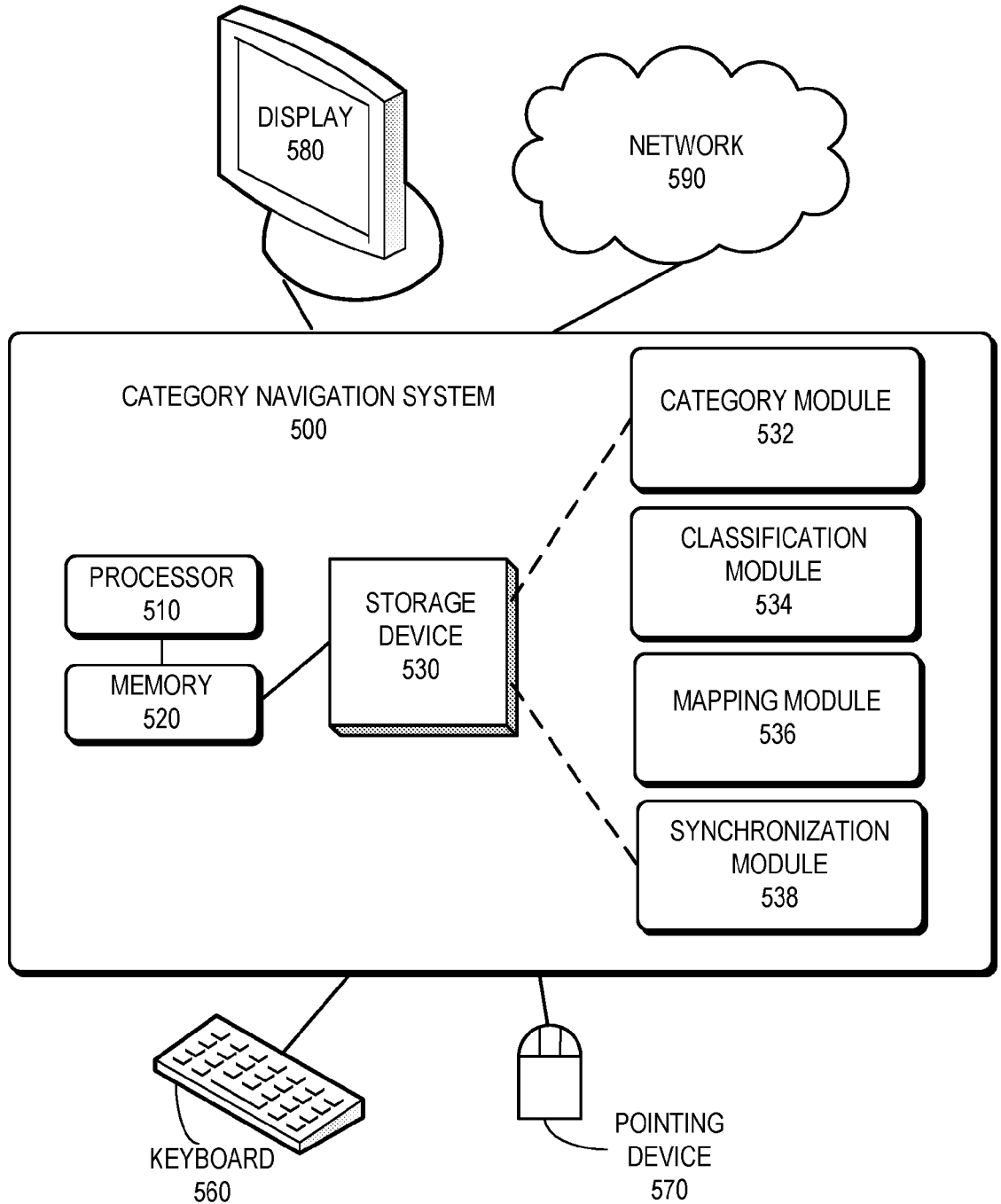
FIG. 5 presents an exemplary category navigation system with efficient category management support, in accordance with an embodiment of the present application.

FIG. 5 presents an exemplary category navigation system with efficient category management support, in accordance with an embodiment of the present application. A category navigation system 500 can facilitate efficient category management. System 500 includes a processor 510, a memory 520, and a storage device 530. Storage device 530 typically stores instructions that can be loaded into memory 520 and executed by processor 510 to perform the methods described above. In one embodiment, the instructions in storage device 530 can implement a category module 532, a classification module 534, a mapping module 536, and a synchronization module 538, all of which can communication with each other through various means. Storage device 530 can store a database and memory 520 can store a cache.

In some embodiments, modules 532, 534, 536, and 538 can be partially or entirely implemented in hardware and can be part of processor 510. Further, in some embodiments, data processing system 500 may not include a separate processor and memory. Instead, in addition to performing their specific tasks, modules 532, 534, 536, and 538, either separately or in concert, may be part of special-purpose computation engines.

Storage device 530 stores programs to be executed by processor 510. Specifically, storage device 530 stores a program that implements an e-commerce server and/or a web server. During operation, an application program can be loaded from storage device 530 into memory 520 and executed by processor 510. As a result, category navigation system 500 can perform the functions described above. Category navigation system 500 can be further coupled to an optional display device 580 (e.g., a monitor, a display pad, a projector, etc.), a keyboard 560, and a pointing device 570, and can be coupled via one or more network interfaces to a network 590.

During operation, system 500 can run as a web server, which receives a search request for a product (e.g., via a port of system 500) from a user and can send one or more categories of the product. Category module 532 adds, deletes, and updates a category. Category module 532 can also maintain a range of category identifiers for a site and allocates a category identifier to a category. Classification module 534 determines whether a category is a differentiated category or a synchronization category. Mapping module 536 establishes a mapping between a category in the main site and the corresponding category in a local site. In some embodiments, this mapping is based on category identifiers. Synchronization module 538 synchronizes operations performed on a synchronized category at the main site with a corresponding category at a respective local site.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for efficiently managing navigation categories in a multi-site web environment, comprising:
    determining, by a computing system, that a category of a product is a synchronized category, wherein a synchronized category is shared by a main site and a local site of the multi-site web environment; and
    copying the category from the main site to the local site in response to determining that the category is a synchronized category.

2. The method of claim 1, further comprising establishing a mapping between the category at the main site and the category at the local site, wherein a respective category is assigned a category identifier, and wherein the mapping is based on a first category identifier of the category at the main site and a second category identifier of the category at the local site.

3. The method of claim 2, wherein the first category identifier is in a range of identifiers allocated for the main site, and wherein the second category identifier is in a range of identifiers allocated for the local site.

4. The method of claim 1, further comprising:
    identifying an operation on the category at the main site; and
    in response to a category being a synchronized category, applying the operation to the category at the local site.

5. The method of claim 4, wherein the operation includes one of: addition, deletion, and update.

6. The method of claim 1, further comprising, in response to determining that the category is a synchronized category and receiving an instruction to convert to a differentiated category, converting the category at the local site to a differentiated category by:

terminating a mapping between the category at the main site and the category at the local site; and setting the category to be a differentiated category.

7. The method of claim 1, further comprising, in response to determining that a second category of a second product is a differentiated category and receiving an instruction to convert to a synchronized category, converting the second category at the local site to a synchronized category by:

deleting the second category at the local site;

copying the second category from the main site to the local site; and establishing a mapping between the second category at the main site and the copied category at the local site.

8. The method of claim 1, wherein the main site and the local site are distributed in different geographic areas.

9. A non-transitory computer-readable storage medium storing instructions that when executed by a computer cause the computer to perform a method for efficiently managing navigation categories in a multi-site web environment, the method comprising:

determining, by a computing system, that a category of a product is a synchronized category, wherein a synchronized category is shared by a main site and a local site of the multi-site web environment; and copying the category from the main site to the local site in response to determining that the category is a synchronized category.

10. The non-transitory computer-readable storage medium of claim 9, wherein the method further comprises establishing a mapping between the category at the main site and the category at the local site, wherein a respective category is assigned a category identifier, and wherein the mapping is based on a first category identifier of the category at the main site and a second category identifier of the category at the local site.

11. The non-transitory computer-readable storage medium of claim 10, wherein the first category identifier is in a range of identifiers allocated for the main site, and wherein the second category identifier is in a range of identifiers allocated for the local site.

12. The non-transitory computer-readable storage medium of claim 9, wherein the method further comprises:

identifying an operation on the category at the main site; and in response to a category being a synchronized category, applying the operation to the category at the local site.

13. The non-transitory computer-readable storage medium of claim 12, wherein the operation includes one of: addition, deletion, and update.

14. The non-transitory computer-readable storage medium of claim 9, wherein the method further comprises, in response to determining that the category is a synchronized category and receiving an instruction to convert to a differentiated category, converting the category at the local site to a differentiated category by:

terminating a mapping between the category at the main site and the category at the local site; and setting the category to be a differentiated category.

15. The non-transitory computer-readable storage medium of claim 9, wherein the method further comprises, in response to determining that a second category of a second product is a differentiated category and receiving an instruction to convert to a synchronized category, converting the second category at the local site to a synchronized category by:

deleting the second category at the local site;

copying the second category from the main site to the local site; and establishing a mapping between the second category at the main site and the copied category at the local site.

16. The non-transitory computer-readable storage medium of claim 9, wherein the main site and the local site are distributed in different geographic areas.

17. A computing system for efficiently managing navigation categories in a multi-site web environment, the computing system comprising:

a processor; and a memory coupled to the processor and storing instructions, which when executed by the processor cause the processor to perform a method, the method comprising:

determining that a category of a product is a synchronized category, wherein a synchronized category is shared by a main site and a local site of the multi-site web environment; and copying the category from the main site to the local site in response to determining that the category is a synchronized category.

18. The computing system of claim 15, wherein the method further comprises establishing a mapping between the category at the main site and the category at the local site, wherein a respective category is assigned a category identifier, and wherein the mapping is based on a first category identifier of the category at the main site and a second category identifier of the category at the local site.

19. The computing system of claim 15, wherein the method further comprises:

identifying an operation on the category at the main site, wherein the operation includes one of:

addition, deletion, and update; and in response to a category being a synchronized category, applying the operation to the category at the local site.

20. The computing system of claim 15, wherein the method further comprises:

in response to determining that the category is a synchronized category and receiving an instruction to convert to a differentiated category, converting the category at the local site to a differentiated category; and in response to determining that a second category of a second product is a differentiated category and receiving an instruction to convert to a synchronized category, converting the category at the local site to a synchronized category.

* * * * *